US009237414B2

(12) United States Patent
Naka et al.

(10) Patent No.: US 9,237,414 B2
(45) Date of Patent: Jan. 12, 2016

(54) MAP GENERATION SYSTEM, MAP GENERATION APPARATUS AND MAP GENERATION METHOD

(71) Applicant: FUJITSU LIMITED, Kawasaki-shi, Kanagawa (JP)

(72) Inventors: Yosuke Naka, Kobe (JP); Tatsushige Inaba, Osaka (JP); Hideo Nishi, Miki (JP); Toshirou Nakatake, Kakogawa (JP); Hitoshi Seno, Tokyo (JP); Kiyotaka Iwamoto, Toyonaka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/761,508

(22) Filed: Feb. 7, 2013

(65) Prior Publication Data
US 2013/0237256 A1 Sep. 12, 2013

(30) Foreign Application Priority Data

Mar. 6, 2012 (JP) .................................. 2012-049651

(51) Int. Cl.
*H04W 68/00* (2009.01)
*H04W 4/02* (2009.01)
*H04W 8/14* (2009.01)

(52) U.S. Cl.
CPC ....................................... *H04W 4/02* (2013.01)

(58) Field of Classification Search
CPC ........... B60K 37/06; G05G 1/08; H04W 4/02; Y10T 74/1488; G01C 21/32; G01C 21/00; G01C 21/3673; G01C 21/3676; G01S 5/00; G01S 5/04; G06Q 10/08; G06Q 10/087; G06Q 10/0875

USPC .......................................................... 455/457
See application file for complete search history.

(56) References Cited

U.S. PATENT DOCUMENTS

| 6,420,997 | B1 * | 7/2002 | Cong ............................... 342/70 |
| 2002/0008621 | A1 * | 1/2002 | Barritz et al. ............... 340/572.1 |
| 2004/0099736 | A1 * | 5/2004 | Neumark ....................... 235/385 |
| 2005/0125145 | A1 * | 6/2005 | Sakashita et al. ............. 701/208 |
| 2005/0278062 | A1 * | 12/2005 | Janert et al. ................... 700/214 |
| 2006/0284739 | A1 * | 12/2006 | Lee .......................... 340/995.14 |
| 2008/0027628 | A1 * | 1/2008 | Sakashita et al. ............. 701/200 |
| 2009/0094280 | A1 * | 4/2009 | Chen et al. ................. 707/104.1 |
| 2009/0105944 | A1 * | 4/2009 | Urano et al. .................. 701/202 |
| 2009/0105950 | A1 * | 4/2009 | Arteaga et al. ............... 701/213 |
| 2009/0115609 | A1 * | 5/2009 | Weaver ...................... 340/572.1 |
| 2009/0119305 | A1 * | 5/2009 | Johnson et al. ................. 707/10 |

(Continued)

FOREIGN PATENT DOCUMENTS

JP 5-257530 10/1993
JP 2010-261783 11/2010

*Primary Examiner* — Timothy Pham
(74) *Attorney, Agent, or Firm* — Staas & Halsey LLP

(57) ABSTRACT

A map generation apparatus includes a memory, and a processor configured to execute a procedure, the procedure including obtaining position data indicating positions of the terminal device during moving of the terminal device, and read-position data indicating a position at which the terminal device has read data from a recording medium during the moving of the terminal device, storing the position data and the read-position data in the memory, generating a map including the positions indicated by the position data, and displaying that an area on a side of the read-position data among areas set based on a path of the positions indicated by the position data is an area of disposition target of the recording medium, on the generated map.

19 Claims, 17 Drawing Sheets

(56) References Cited

U.S. PATENT DOCUMENTS

| | | |
|---|---|---|
| 2009/0212915 A1* | 8/2009 | Ulrich .......................... 340/10.1 |
| 2010/0125408 A1* | 5/2010 | Shikimachi et al. .......... 701/201 |
| 2010/0265061 A1* | 10/2010 | Harmon et al. .......... 340/539.13 |
| 2010/0325019 A1* | 12/2010 | Avery ............................ 705/28 |
| 2011/0137550 A1* | 6/2011 | Choi ............................. 701/201 |
| 2014/0006672 A1* | 1/2014 | Das et al. ...................... 710/305 |

* cited by examiner

FIG. 4

| DATE & TIME | LATITUDE (x) | LONGITUDE (y) | SCANNED OR NOT | DISPOSITION NUMBER |
|---|---|---|---|---|
| 2011/03/03 17:18:17.222 | 34.669965 | 135.163344 | 0 | 1 |
| 2011/03/03 17:18:18.222 | 34.669967 | 135.163345 | 0 | 2 |
| 2011/03/03 17:18:19.222 | 34.669968 | 135.163346 | 0 | 3 |
| 2011/03/03 17:18:20.222 | 34.669967 | 135.163346 | 0 | 4 |
| 2011/03/03 17:18:21.222 | 34.669970 | 135.163350 | 1 | 5 |
| 2011/03/03 17:18:22.222 | 34.669969 | 135.163355 | 0 | 6 |

FIG. 5

| REGRESSION EQUATION | START POINT(x,y) | END POINT(x,y) | RACK SIDE | DISPOSITION NUMBER |
|---|---|---|---|---|
| y=0.8x+2.2 | 34.669964, 135.163344 | 34.669994, 135.163394 | UPPER | 1-200 |
| ... | | | | |

MAP GENERATION SYSTEM, MAP GENERATION APPARATUS AND MAP GENERATION METHOD

CROSS-REFERENCE TO RELATED APPLICATIONS

This application is based upon and claims the benefit of priority of the prior Japanese Patent Application No. 2012-49651, filed on 6 Mar., 2012, the entire contents of which are incorporated herein by reference.

FIELD

The embodiments discussed herein are related to generation of a map.

BACKGROUND

In order to perform asset management, inventory taking is carried out at business enterprises, etc., on a regular basis. For example, in an inventory taking using bar codes, locations of assets are checked by scanning recording media, such as bar codes, etc., attached on managed assets by a bar code reader. It is preferable for an operator who takes an inventory to grasp where the managed assets are located. Accordingly, a manager creates a floor map of a building, and there arises marking work of places where managed assets are located. However, if the number of managed assets becomes large, a burden on the manager increases, and recording of position data becomes difficult. In order to handle this problem, there is a method of including character information indicating a position by a text, such as "disposed at a south side of the building on the 10-th floor", for example, in information on assets of an asset management apparatus.

In this regard, the following technique has been proposed on creation of a map. For example, a technique has been proposed in which a movement locus from leaving an existing road on map data to returning is memorized as an undetermined route, and if two memorized undetermined routes has a high correlation coefficient, the undetermined route is stored in map data as a new road. Also, a technique has been proposed in which an estimated position of a mobile robot in an estimated coordinate system is calculated from a movement direction and a movement distance, a position of a known reference object is measured to obtain the position of the reference object in the estimated coordinate system, and the movement direction and position in an absolute coordinate system is calibrated from the position in the estimated coordinate system.

However, there is a problem in that when positions of managed assets are controlled by texts in the same manner as in related arts, it is difficult to grasp the positions of the managed assets.

In this regard, in the technique of storing a data item of a new road in a map, if a road uncharted on the map is not passed through two times, that road is not registered in the map as a new road. Accordingly, in the case of inventory taking in which various movement paths are drawn on a floor, it is difficult to create a floor map from a movement locus. Also, in the technique of calibrating a movement direction and position in an absolute coordinate system, it is a prerequisite that a position of a known reference object in absolute coordinates is already known. In the case where absolute coordinates are unknown, it becomes difficult to calibrate a movement direction and position in the absolute coordinate system.

SUMMARY

According to an aspect of the invention, a map generation apparatus includes a memory, and a processor configured to execute a procedure, the procedure including obtaining position data indicating positions of the terminal device during moving of the terminal device, and read-position data indicating a position at which the terminal device has read data from a recording medium during the moving of the terminal device, storing the position data and the read-position data in the memory, generating a map including the positions indicated by the position data, and displaying that an area on a side of the read-position data among areas set based on a path of the positions indicated by the position data is an area of disposition target of the recording medium, on the generated map.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a data structure of a position data table.

FIG. 5 illustrates an example of a data structure of a path information table.

DESCRIPTION OF EMBODIMENTS

In the following, a detailed description will be given of a map display program, a map generation apparatus, a map display method, and a map generation system according to embodiments of the present disclosure with reference to the drawings. In this regard, in the following, a description will be given of the case where the present disclosure is applied to management of inventory assets. However, the present disclosure is not limited by these embodiments. And it is possible to suitably combine the individual embodiments unless processing contents conflict with each other.

First Embodiment

Figure 1:
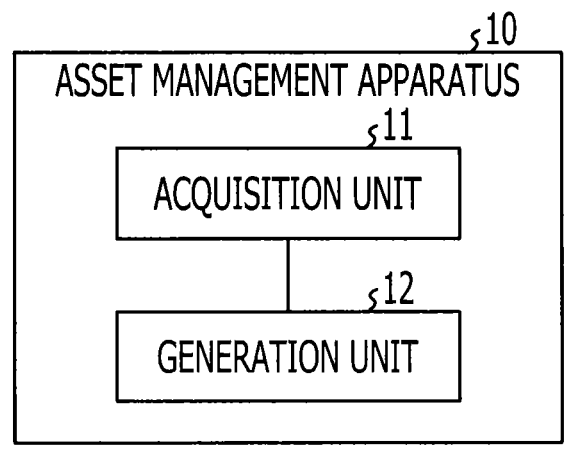
FIG. 1 illustrates an example of configuration of an asset management apparatus.

A description will be given of a map generation apparatus 10 according to a first embodiment. FIG. 1 illustrates an example of configuration of an asset management apparatus. The map generation apparatus 10 is a physical server controlling managed assets, for example, a server computer installed at data centers or individual business enterprises.

As illustrated in FIG. 1, the map generation apparatus 10 has an acquisition unit 11 and a generation unit 12.

The acquisition unit 11 acquires various kinds of data. For example, the acquisition unit 11 acquires a group of position data indicating positions of the terminal device at a plurality of places while the terminal device was moving, and read-position data indicating positions at which the terminal device has read data from recording media while the terminal device was moving. For example, the acquisition unit 11 acquires read-position data indicating positions at which data have been read from recording media attached to managed assets. The acquisition unit 11 may read and acquire position data from a recording medium, for example, a flexible disk (FD) inserted in the map generation apparatus 10, a compact disk read only memory (CD-ROM), an integrated circuit (IC) card, etc. Also, the acquisition unit 11 may acquire a plurality of pieces of position data from a terminal device by which inventory is taken through a network, such as a public network, the Internet, a local area network (LAN), a wide area network (WAN), etc.

The generation unit 12 generates various kinds of data. For example, when the generation unit 12 generates map information including positions indicated by a group of position data acquired by the acquisition unit 11, the generation unit 12 generates a map displaying that an area on a side of the read-position data is an area of disposition target in the recording medium rather than a path indicated by the group of position data among areas included in the map information. In this regard, in the example in FIG. 1, the acquisition unit 11 and the generation unit 12 are separated because of displaying a functional configuration. However, for example, the acquisition unit 11 and the generation unit 12 may be configured in one device. As an example of the device, an electronic circuit, such as a central processing unit (CPU), a micro processing unit (MPU), etc., are given. In this regard, as the device, it is possible to employ an integrated circuit, such as an application specific integrated circuit (ASIC), a field programmable gate array (FPGA), etc.

In this manner, the map generation apparatus 10 acquires a group of position data indicating positions of the terminal device at a plurality of places when a terminal device is moving, and read-position data indicating positions at which the terminal device has read data from recording media during the moving of the terminal device. When the map generation apparatus 10 generates map information including positions indicated by the acquired group of position data, the map generation apparatus 10 generates map information displaying that an area on a side of the read-position data is an area of disposition target in the recording medium rather than a path indicated by the group of position data among areas included in the map information. Thereby, the map generation apparatus 10 displays that an area on a side of the read-position data is an area of disposition target in the recording medium rather than a path in the generated map, and thus it is possible to grasp positions of the managed assets.

Second Embodiment

Figure 2:
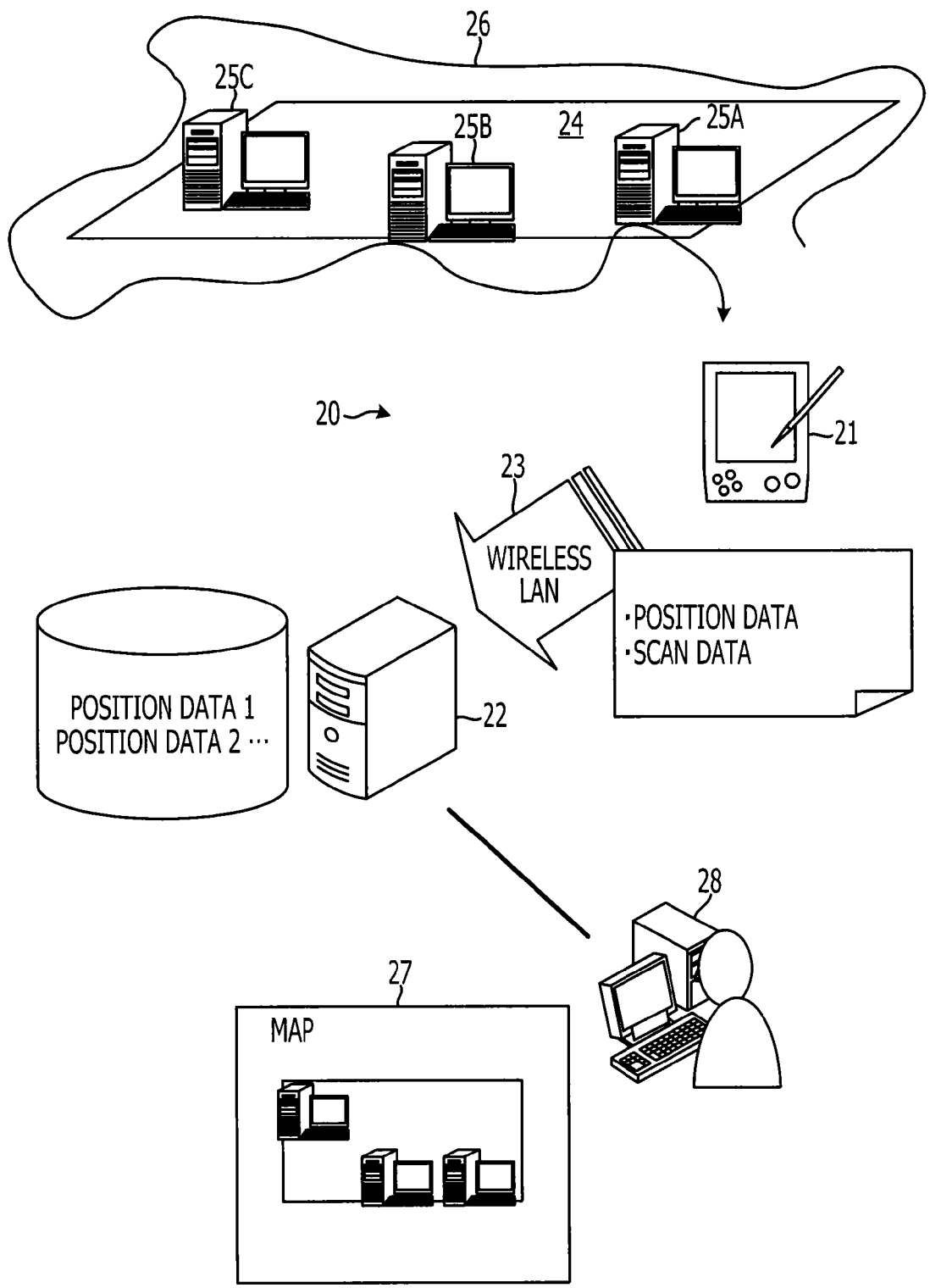
FIG. 2 schematically illustrates an example flow at the time of inventory taking.

A description will be given of a second embodiment. In the second embodiment, a description will be given of a system in which the reading device reads managed assets and takes inventory of the managed assets, and a management server controls an inventory taking result. FIG. 2 schematically illustrates a flow at the time of inventory taking. As illustrated in FIG. 2, a system 20 has a reading device 21 and a management server 22. The reading device 21 and the management server 22 are connected through a network 23 in a manner allowing communication. As one mode of such a network 23, any communication network, such as the Internet, a LAN, a virtual private network (VPN), etc., are given regardless of whether wired or wireless. In the example in FIG. 2, it is assumed that a wireless LAN is used for the network 23.

The reading device 21 has a bar code reader. An inventory taking operator carries the reading device 21, moves around a floor 24 on which managed assets are disposed, and checks locations of the assets by reading recording media, such as bar codes, etc., attached on managed assets 25A to 25C with the bar code reader of the reading device 21. In the example in FIG. 2, a curve 26 drawn around the floor 24 indicates a moving route of the reading device 21 when inventory taking is conducted. The reading device 21 transmits scan data including identification data indicating the read asset to the management server 22. Also, the reading device 21 is capable of obtaining a position of the own device, and transmits a plurality of pieces of position data indicating the read asset locations and individual positions of the moving route on which the reading device 21 has moved to the management server 22.

The management server 22 manages the assets on the basis of the scan data transmitted from the reading device 21. Also, the management server 22 generates a map 27 indicating the scanned asset disposition on the basis of the plurality of pieces of position data transmitted from the reading device 21. A manager and an inventory-taking operator can easily grasp the positions of the managed assets by checking the map 27. The example in FIG. 2 illustrates the case where a manager referred to the map 27 using a terminal device 28 accessible to the management server 22.

Figure 3:
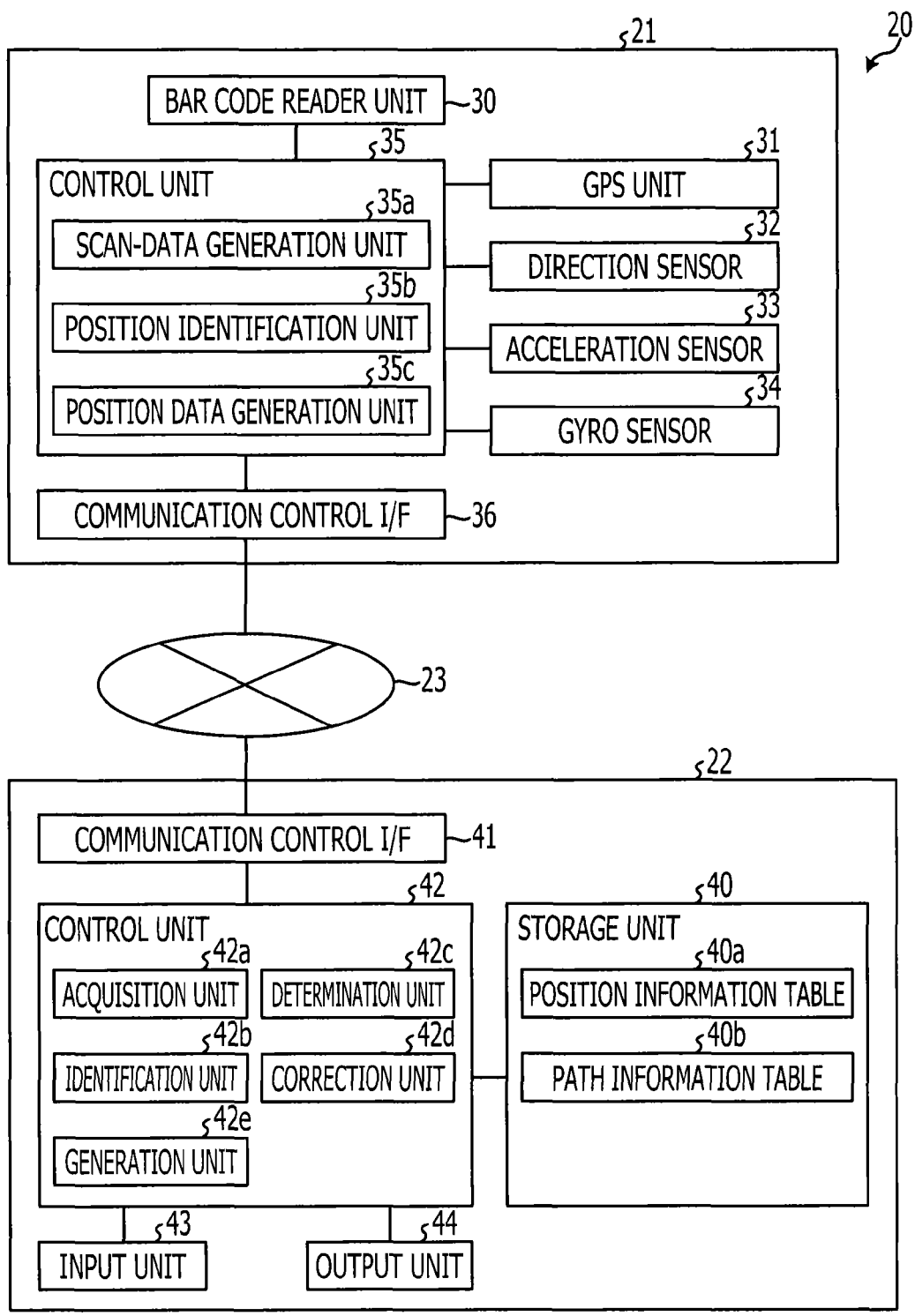
FIG. 3 illustrates an example of a functional configuration of a system according to a second embodiment.

FIG. 3 illustrates an example of a functional configuration of a system according to the second embodiment. As illustrated in FIG. 3, the reading device 21 has a bar code reader unit 30, a global positioning system (GPS) unit 31, a direction sensor 32, an acceleration sensor 33, a gyro sensor 34, a control unit 35, and a communication control interface (I/F) 36. For example, the reading device 21 may be a smart-phone, a personal digital assistance, or a wireless phone installed with an application program implemented functions of functional units included in the reading device 21.

The bar code reader unit 30 reads a bar code, and outputs identification data that identifies an asset that is coded as the bar code to the control unit 35. The bar code reading unit may read and obtain the identification data from quick response (QR) code or a specific object by using image-recognition technique. When the GPS unit 31 receives signals from three GPS satellites or more, the GPS unit 31 calculates a current position indicated by latitude and longitude on the basis of the received signals, and outputs position data indicating the current position to the control unit 35. The direction sensor 32 detects geomagnetism, and outputs direction data indicating a geomagnetic direction to the control unit 35. The acceleration sensor 33 individually detects acceleration in three axial directions when the reading device 21 moves, and outputs acceleration data indicating acceleration in three axial directions to the control unit 35. The gyro sensor 34 detects an angle and an angular velocity of the reading device 21, and outputs angle data indicating the angle and the angular velocity to the control unit 35.

The control unit 35 is an electronic circuit, such as a CPU, an MPU, etc., for example, and has a scan data generation unit 35a, a position identification unit 35b, and a position data generation unit 35c. The scan data generation unit 35a generates scan data including identification data of the read assets.

The position identification unit 35b identifies a current position. For example, when the position identification unit 35b receives input of position data from the GPS unit 31, the position identification unit 35b determines latitude and longitude indicated by the position data to be the current position. Also, if there is no position data inputted from the GPS unit 31, the position identification unit 35b identifies individual directions on the basis of the direction data inputted from the direction sensor 32. Also, the position identification unit 35b identifies acceleration in individual directions on the basis of acceleration data inputted from the acceleration sensor 33. Further, the position identification unit 35b identifies angles and angular velocities in individual directions on the basis of angle data inputted from the gyro sensor 34. And the position identification unit 35b performs autonomous position estimation by updating the latitude and longitude on the assumption that the reading device moves to the individual directions with the individually identified acceleration and angular velocities from the latitude and longitude indicated by the position data inputted last to identify the current position. In this regard, in the following, a description will be given of coordinates of a position on the assumption that the latitude direction is an X-axis direction, and the longitude direction is a Y-axis direction.

The position data generation unit 35c periodically generates position data including generation date and time, a position identified by the position identification unit 35b, and a flag indicating whether the position is an asset position or a moving route position. When the bar code reader unit 30 has read a bar code, the position data generation unit 35c sets a flag indicating an asset position in position data immediately after that, and generates the position data.

The communication control I/F unit 36 is an interface which has at least one port, and controls communication with the management server 22. For example, the communication control I/F unit 36 transmits the scan data generated by the scan data generation unit 35a to the management server 22. Also, the communication control I/F unit 36 transmits the position data generated by the position data generation unit 35c to the management server 22.

On the other hand, the management server 22 has a storage unit 40, a communication control I/F 41, a control unit 42, an input unit 43, and an output unit 44.

The storage unit 40 stores various kinds of data. For example, the storage unit 40 stores a position data table 40a and a path information table 40b. Examples of devices of the storage unit 40 includes a rewritable semiconductor memory, such as a flash memory, a non volatile static random access memory (NVSRAM), etc., and a storage device, such as a hard disk, an optical disc, etc.

The position data table 40a is a table for storing position data transmitted from the reading device 21. FIG. 4 illustrates an example of a data structure of the position data table. In the position data table 40a, position data is stored in a separate record for each position data. As illustrated in FIG. 4, the position data table 40a includes individual items, such as date and time, latitude (x), longitude (y), whether scanned or not, and a disposition number. The item of date and time is an area for storing date and time at which position data is generated. The item of latitude is an area for storing latitude of a position indicated by the position data. The item of longitude is an area for storing longitude of the position indicated by the position data. The item of whether scanned or not is an area for storing the flag indicating whether the position is an asset position or a moving route position. In the item of whether scanned or not, "0" indicates a moving route position, and "1" indicates an asset position. The item of disposition number is an area for storing a disposition number assigned to position data. In the present embodiment, a disposition number is assigned to position data in the order of date and time from 1 in sequence, and the assigned disposition number is stored in the item of the disposition number.

In the example in FIG. 4, position data having date and time of "2011/03/03/17:18:17.222" indicates a position at longitude "34.669965" and latitude "135.163344". Also, position data having date and time of "2011/03/03/17:18:17.222" has a whether-scanned-or-not flag of "0", and thus the position data is a moving route position with a disposition number of "1". On the other hand, position data having date and time of "2011/03/03/17:18:21.222" indicates a position at longitude "34.669970" and latitude "135.163350". Also, position data having date and time of "2011/03/03/17:18:21.222" has whether-scanned-or-not flag of "1", and thus the position data is an asset position with a disposition number of "5".

In the position data table 40a, the position data acquired by the acquisition unit 42a described later is stored. Each position data stored in the position data table 40a is used for processing performed by the below-described identification unit 42b, determination unit 42c, and correction unit 42d.

The path information table 40b is a table in which data on a path is stored. FIG. 5 illustrates an example of a data structure of the path information table. The path information table 40b has individual items, such as a regression equation, a start point (x, y), an end point (x, y), a rack side, and a disposition number. The item of the regression equation is an area in which a regression equation indicating a path is stored. The item of the start point (x, y) is an area in which coordinates of a position to be a start point of a path is stored. The item of the end point (x, y) is an area in which coordinates of a position to be an end point is stored. The item of the rack side is an area where which side of a path is a rack side is stored. The item of the disposition number is an area where a disposition number of position data of a section corresponding to a path is stored.

In the example in FIG. 5, a path has a regression equation of "y=0.8x+2.2", and indicates that a start point is latitude "34.669964" and longitude "135.163344", and an end point is latitude "34.669994" and longitude "135.163394". Also, an "upper" side of the path is a rack side, and disposition numbers of position data of a section corresponding to the path are "1" to "200".

In the path information table 40b, path information of a path identified by the identification unit 42b described later is stored. The path information stored in the path information table 40b is used for processing performed by generation unit 42e described later.

Referring back to description of FIG. 3, the communication control I/F unit 41 has at least one port, and is an interface which controls communication with the reading device 21. For example, the communication control I/F unit 41 receives scan data transmitted from the reading device 21. Also, the communication control I/F unit 41 receives the position data transmitted from the reading device 21.

The control unit 42 is an electronic circuit, such as a CPU, an MPU, etc., for example, and has an acquisition unit 42a, an identification unit 42b, a determination unit 42c, a correction unit 42d, and a generation unit 42e.

The acquisition unit 42a acquires various kinds of data. For example, the acquisition unit 42a acquires positions of the managed assets read by the reading device 21 that reads managed assets at the time of inventory taking, and a plurality of pieces of position data indicating individual positions of a moving route on which the reading device has moved. For example, the acquisition unit 42a stores position data received by the communication control I/F unit 41 into the position data table 40a.

The identification unit 42b identifies path positions on the basis of the plurality of pieces of position data acquired by the acquisition unit 42a. The identification unit 42b performs, for example, predetermined analysis on the plurality of position data to identify the path positions. The predetermined analysis may be performed by any method as long as path positions can be identified. The predetermined analysis includes, for example, a simple regression analysis, a multiple regression analysis, and an analysis method that determines a belt-shaped path by setting a confidence interval. The identification unit 42b performs predetermined analysis on the plurality of pieces of position data to identify the path positions. For example, the identification unit 42b divides the moving route indicated by the plurality of position data into a plurality of sections, and performs regression analysis. And the identification unit 42b identifies a regression line having an error between the regression line obtained by the regression analysis and a section corresponding to that regression line within a predetermined range to be the path position.

Figure 6:
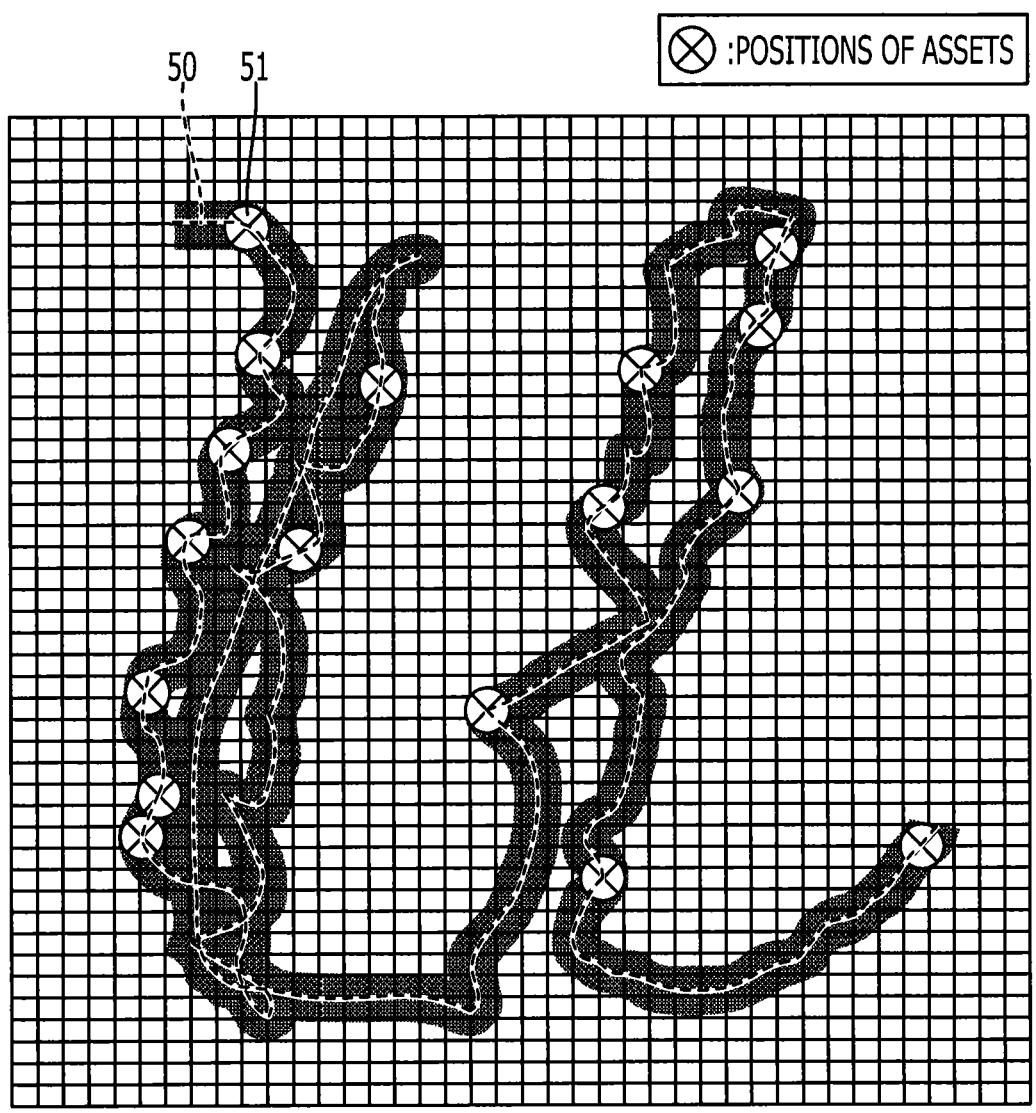
FIG. 6 illustrates an example of a moving route of a reading device indicated by position data stored in the position data table.

FIG. 6 illustrates an example of a moving route of a reading device indicated by position data stored in the position data table. In the example of FIG. 6, a moving route 50 of the reading device is denoted by a broken line, and asset positions are denoted by symbols 51. Also, in the example in FIG. 6, an error range of positions with respect to the moving route 50 is indicated by a belt having a predetermined width.

For example, the identification unit 42b performs simple regression analysis using the least squares method on a position indicated by each position data to be processed for all the pieces of position data stored in the position data table 40a to obtain regression lines. The identification unit 42b obtains a perpendicular line that is orthogonal to a regression line through a position indicated by position data having a smallest disposition number among each position data to be processed, and obtains coordinates of a point of the intersection of the perpendicular line with the regression line as a start point. Also, the identification unit 42b obtains a perpendicular line that is orthogonal to a regression line through a position indicated by position data having a largest disposition number among position data to be processed, and obtains coordinates of a point of the intersection of the perpendicular line with the regression line as an end point. And the identification unit 42b determines whether a section between the start point and the end point of the regression line passes through an error range of positions indicated by each position data to be processed. If the section between the start point and the end point of the regression line does not pass through an error range of the position indicated by any one piece of position data, the identification unit 42b excludes position data having the largest disposition number from a processing target, and performs the same processing on each position data to be processed once again. On the other hand, if the section between the start point and the end point of the regression line passes through an error range of position of each position data to be processed, the identification unit 42b stores the regression line, the start point, and the end point into the path information table 40b as a path in a section of a moving route indicated by each position data to be processed. And the identification unit 42b excludes position data in the section in which a path has been determined, and identifies a path from the remaining position data.

Figure 7:
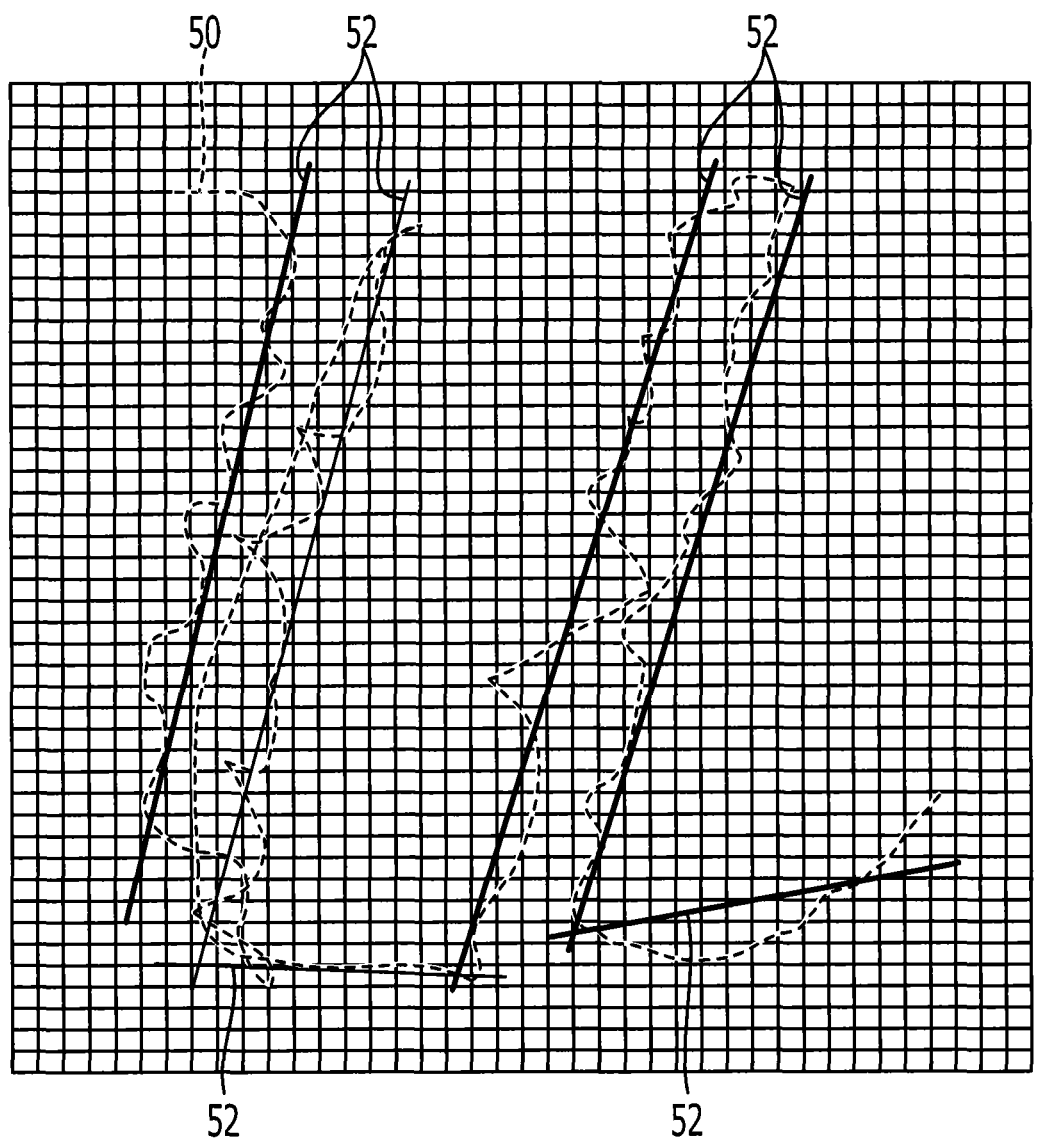
FIG. 7 illustrates an example of a result of paths obtained for the moving route illustrated in FIG. 6.

FIG. 7 illustrates an example of a result of paths obtained for the moving route illustrated in FIG. 6. In FIG. 7, paths 52 are illustrated by lines for individual parts of the moving route 50.

The determination unit 42c determines which side of the path identified by the identification unit 42b is a rack side in which managed assets are disposed on the basis of the plurality of pieces of position data acquired by the acquisition unit 42a. This determination may be made by any method if it is possible to determine the rack side of the path. For a method of determining a rack side, if a section corresponding to a path of a moving route includes positions of managed assets, there is a method of determining a rack side in accordance with the disposition state of assets. For example, the determination unit 42c may determine that a side of a path on which a lot of managed assets are disposed is a rack side. Also, if a section corresponding to a path of a moving route includes positions of managed assets, the determination unit 42c obtains a regression line of the positions of the managed assets, and may determine that a side of the path on which the regression line is disposed is a rack side. Also, for a method of determining a rack side, there is a method of determining a rack side in accordance with a state of a section corresponding to a path of a moving route. For example, the determination unit 42c obtains a position at which a moving route is farthest from a path in a section corresponding to a path of a moving route, and may determine that a contrary side to the farthest position from the path is a rack side. For example, the determination unit 42c determines whether or not a section corresponding to a path of a moving route includes an asset position. That is to say, the determination unit 42c indicates a position of a section corresponding to a path of a moving route, and if there is position data including an item of whether scanned or not is "1", the determination unit 42c determines that the section includes an asset position. If a section corresponding to a path of a moving route includes an asset position, the determination unit 42c obtains a regression line of the asset position, and determines that a side of a path on which the regression line is disposed is a rack side. On the other hand, if a section corresponding to a path of a moving route does not include an asset position, the determination unit 42c determines that a contrary side to a path at a position of the farthest moving route from the path in the section corresponding to the path is a rack side.

Figure 8:
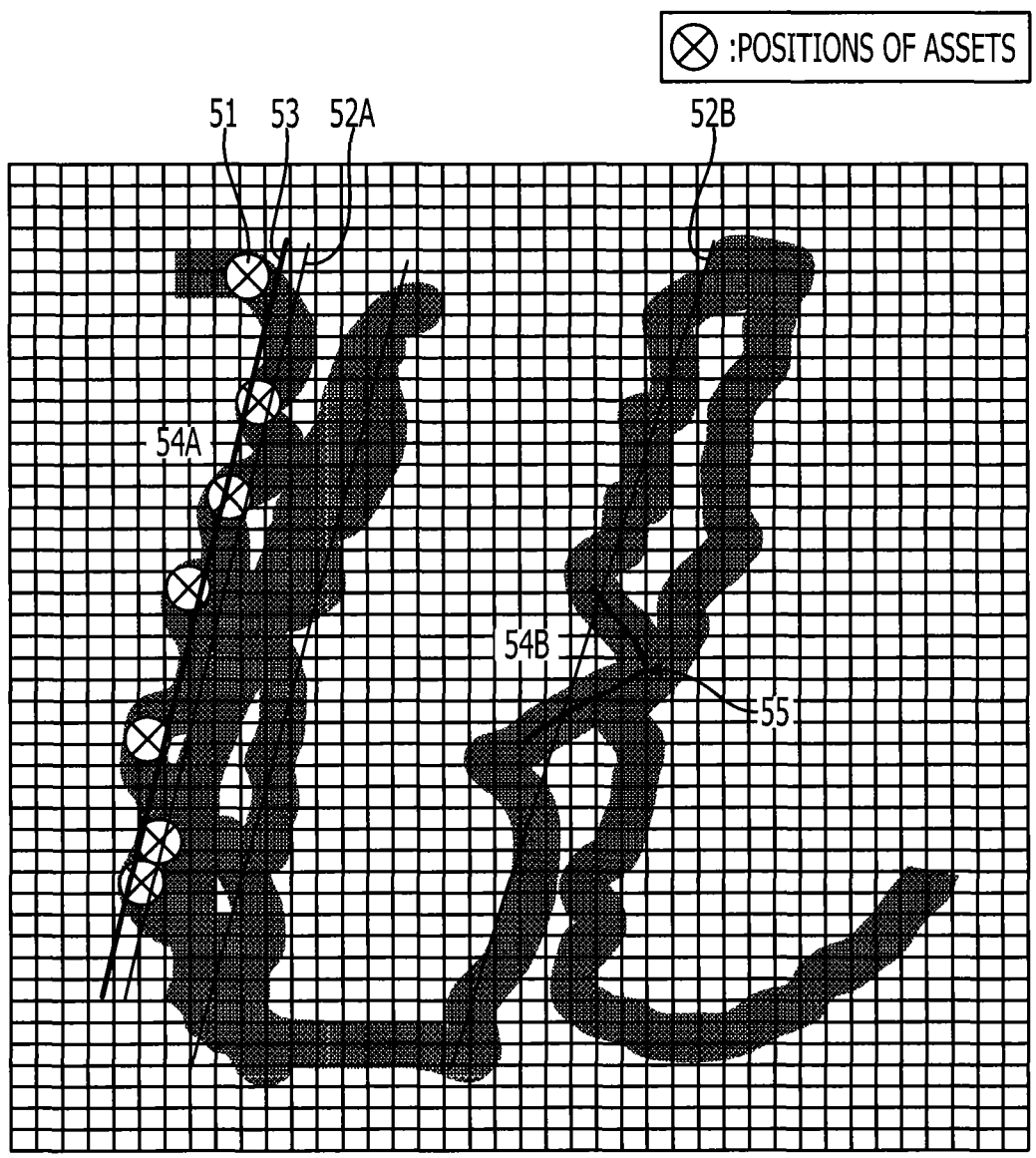
FIG. 8 illustrates an example of determination of a rack side with respect to a path.

FIG. 8 illustrates an example of determination of a rack side with respect to a path. In the example of FIG. 8, sections corresponding to a path 52A of a moving route include asset positions. Accordingly, the determination unit 42c obtains a regression line 53 of the asset positions, and determines that a side of the path 52A on which the regression line 53 is disposed is a rack side. In the example in FIG. 8, the determination unit 42c determines that a side of an area 54A is a rack side of the path 52A. On the other hand, in the path 52B, a section corresponding to the path 52B of the moving route does not include an asset position. Accordingly, the determination unit 42c obtains a position 55 at which a moving route is the farthest from the path 52B in a section corresponding to the path 52B. In the example of FIG. 8, a position 55 is a position that is the farthest from the path 52B. And the determination unit 42c determines that a contrary side to the position 55 in the path 52B is a rack side. In the example in FIG. 8, a side of an area 54B is determined to be a rack side of the path 52B.

Here, when an operator conducts inventory taking of managed assets, the operator moves on a path on a floor with carrying the reading device 21, and moves from the path to a rack side on which assets are disposed at individual asset positions in order to read assets by the reading device 21. Accordingly, a regression line of asset positions becomes a rack side of the path. Thus, the determination unit 42c determines that a side of the path on which a regression line of asset positions is disposed is a rack side.

Also, on a rack side, a path has a small movable range because of a restriction by a rack on which assets are disposed, whereas the path has a large movable range on a side that is not a rack side because of no restriction by the rack. Thus, the determination unit 42c determines that a contrary side to a path of the farthest position is a rack side.

Incidentally, when the reading device 21 identifies a current position by performing autonomous position estimation from acceleration, etc., precision of the position is low.

Thus, the correction unit 42d performs correction of asset positions. For example, the correction unit 42d performs correction so as to bring asset positions closer from a path to positions at a predetermined distance on a rack side. The correction unit 42d obtains, for example, a perpendicular line that is orthogonal to a regression line indicating a path and is through an asset position to be corrected. And the correction unit 42d obtains coordinates of a position that is a predetermined distance away on the rack side of the perpendicular line from an intersection point between a perpendicular line and a regression line indicating a path as a first correction candidate point. Also, the correction unit 42d obtains coordinates of a second correction candidate point whose position is the shortest from the first correction candidate point within an error range from an asset position on the perpendicular line. If the first correction candidate point is within the error range from an asset position, the correction unit 42d corrects the asset position to the first correction candidate point. On the other hand, if the first correction candidate point is not within the error range from an asset position, the correction unit 42d corrects the asset position to the second correction candidate point. In this regard, the predetermined distance may be a fixed value, and a manager may set any value and may set a different value for each path.

Figure 9:
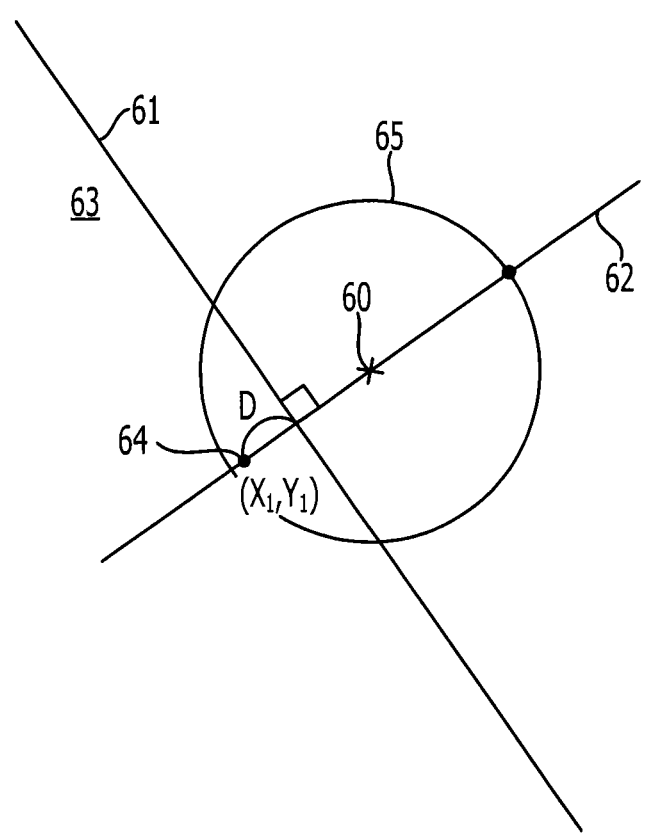
FIG. 9 exemplary illustrates correction of an asset position.
Figure 10:
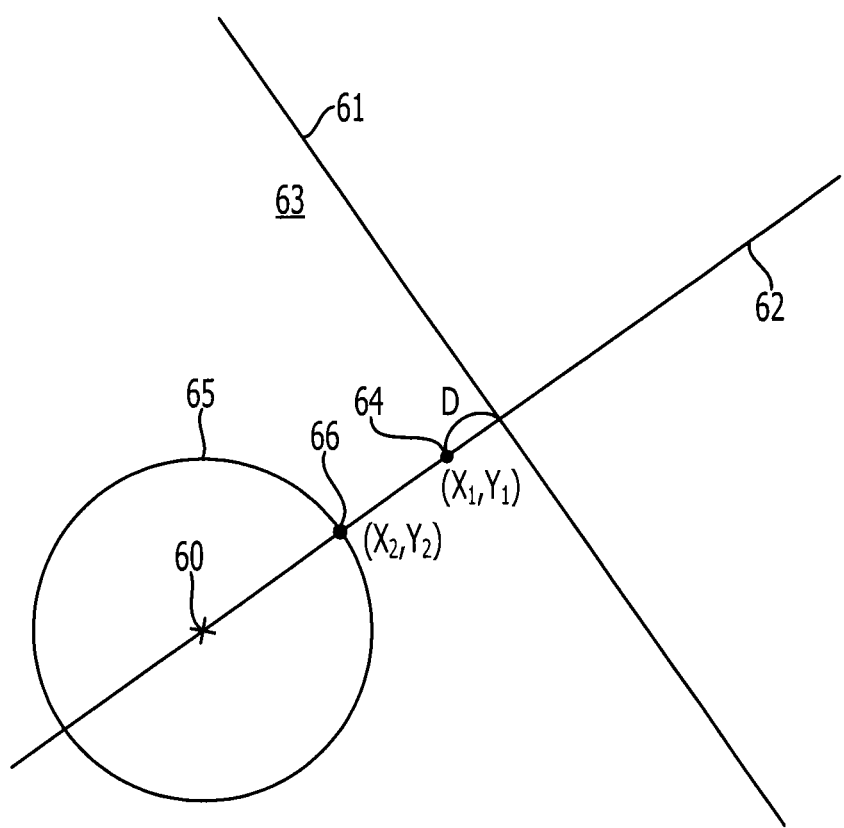
FIG. 10 exemplary illustrates correction of an asset position.

FIG. 9 and FIG. 10 exemplary illustrate correction of an asset position. In the example in FIG. 9, the correction unit 42d obtains a perpendicular line 62 that passes through an asset position 60 and is perpendicular to a regression line 61 indicating a path, and obtains coordinates $(X_1, Y_1)$ of a position at a predetermined distance D from the intersection of the perpendicular line 62 and the regression line 61 on the rack side 63 in the perpendicular line as a first correction candidate point 64. In the example in FIG. 9, the first correction candidate point 64 is within an error range 65 of the asset position 60, and thus the asset position is corrected to the first correction candidate point 64.

In this manner, by correcting the asset position 60 to the first correction candidate point 64, even if there is an error in the asset position 60 identified by the reading device 21, it is possible to align the asset position 60 with a position at a predetermined distance from the path.

In the example in FIG. 10, the correction unit 42d obtains a perpendicular line 62 that passes through an asset position 60 and is perpendicular to a regression line 61 indicating a path, and obtains coordinates $(X_1, Y_1)$ of a position at a predetermined distance D from the intersection of the perpendicular line 62 and the regression line 61 on the rack side 63 in the perpendicular line as a first correction candidate point 64. In the example in FIG. 10, the first correction candidate point 64 is not within an error range 65 of the asset position 60. Thus, in the example in FIG. 10, the correction unit 42d obtains coordinates $(X_2, Y_2)$ of a second correction candidate point 66 whose position is the shortest from the first correction candidate point 64 within the error range 65 from an asset position on the perpendicular line 62, and corrects the asset position to the second correction candidate point 66.

In this manner, if the first correction candidate point 64 is not within the error range of the asset position 60, by correcting the asset position 60 to the second correction candidate point 66, it is possible to inhibit the asset position 60 from being excessively corrected outside the range of error.

Figure 11:
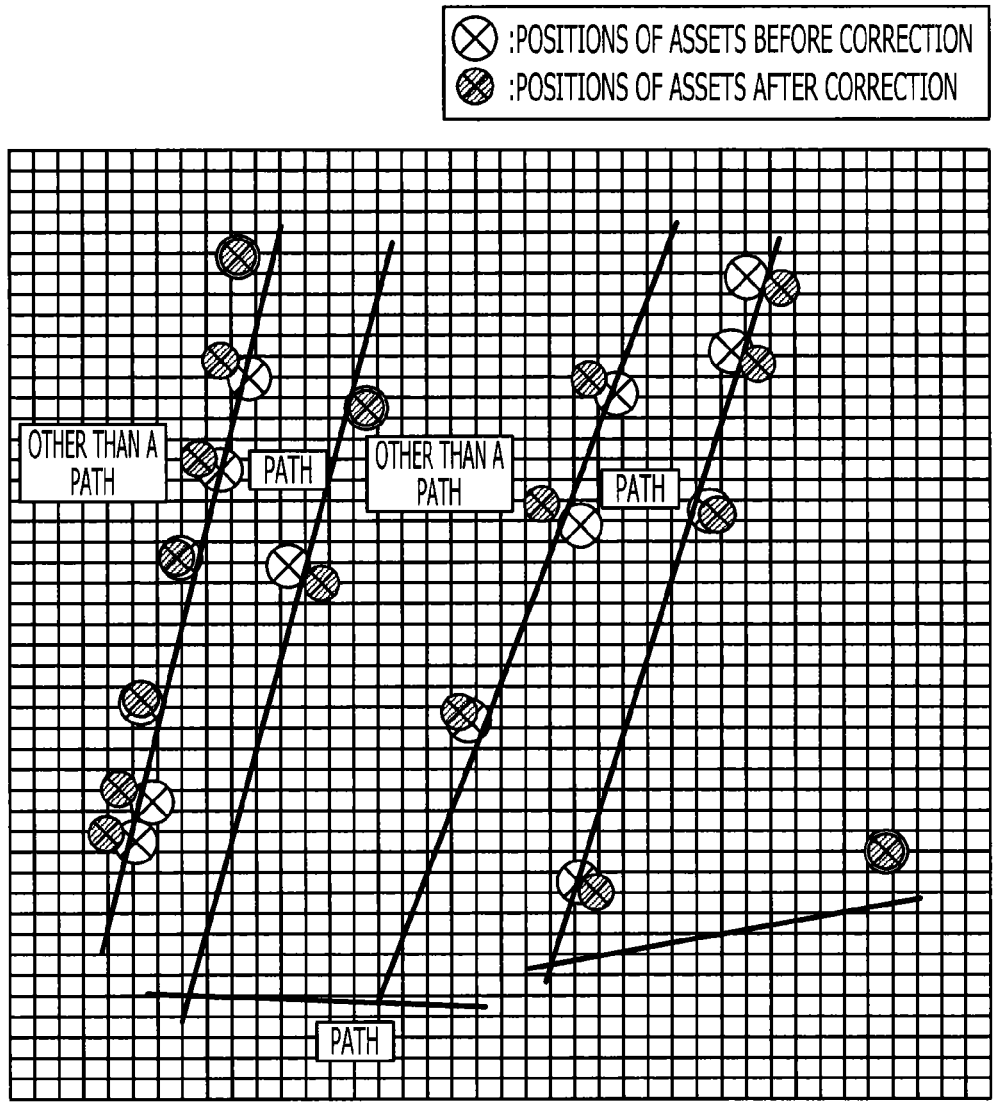
FIG. 11 illustrates an example of a result of correction of asset positions.

FIG. 11 illustrates an example of a result of correction of asset positions. In the example in FIG. 11, a rack side with respect to a path is expressed as "other than a path". In the example in FIG. 11, asset positions are corrected so as to be individually put closer to positions at a predetermined distance on the rack side from the path.

The generation unit 42e generates a map on which managed assets are disposed for a disposition configuration of paths identified by the identification unit 42b on the basis of a determination result by the determination unit 42c. The generation unit 42e generates, for example, a map on which managed assets are disposed on a rack side of a path. For example, the generation unit 42e generates a map on which assets are disposed at corrected positions in the disposition configuration of the identified path. The map information of the generated map is stored in the storage unit 40.

Figure 12:
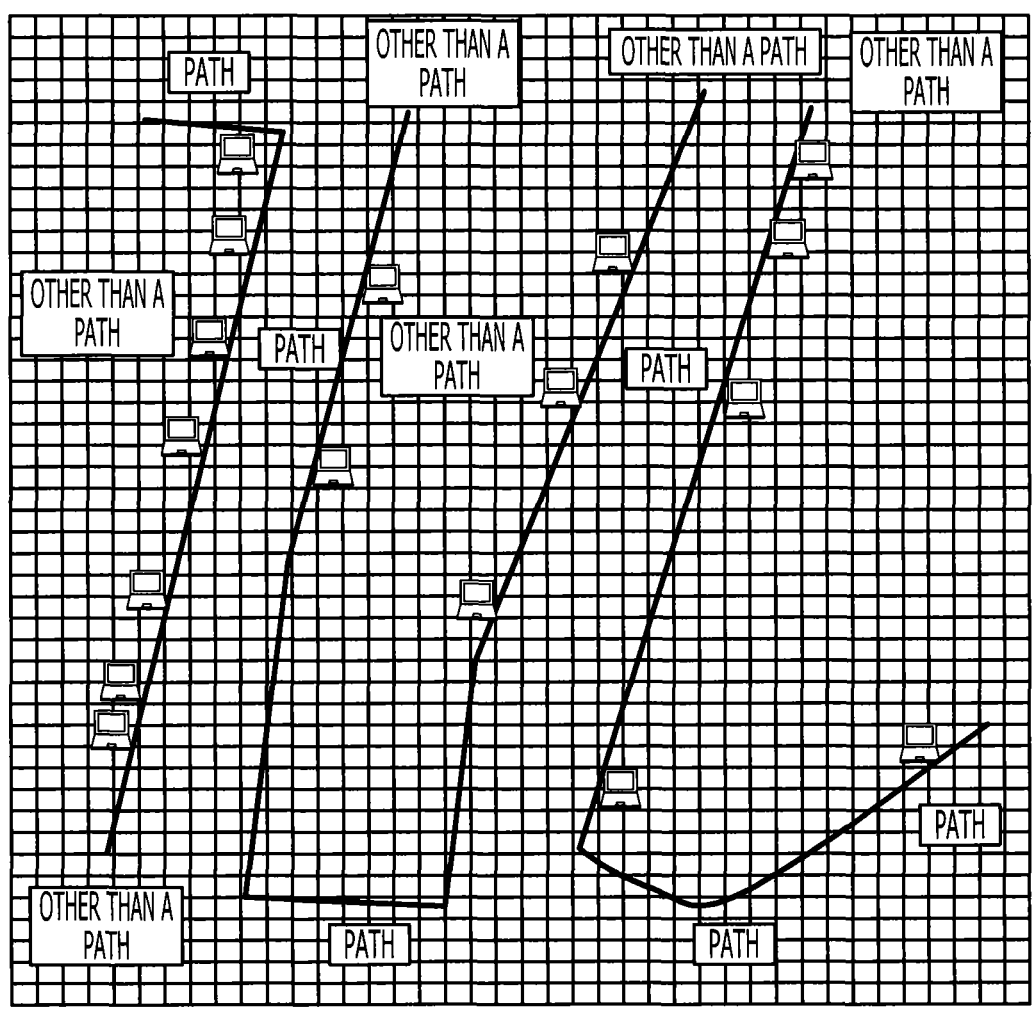
FIG. 12 illustrates an example of a map illustrating a disposition state of assets.

FIG. 12 illustrates an example of a map illustrating a disposition state of assets. In the example in FIG. 12, icons representing computers are displayed at asset positions.

The input unit 43 inputs various kinds of data to the control unit 42. For example, the input unit 43 receives an instruction to create a map indicating a disposition state of assets and an instruction to display a map, and inputs operation data indicating the received operation contents to the control unit 42. For one example of the input unit 43, an operation receiving device, such as a mouse, a keyboard, etc., are given.

The output unit 44 outputs various kinds of data. For example, the output unit 44 displays a map illustrated by map information stored in the storage unit 40. For one example of a device of the output unit 44, a display device, such as a liquid crystal display (LCD), a cathode ray tube (CRT), etc., are given.

Next, a description will be given of a flow of processing which creates a map illustrating a disposition state of assets by the management server 22 according to the present embodiment.

Figure 13:
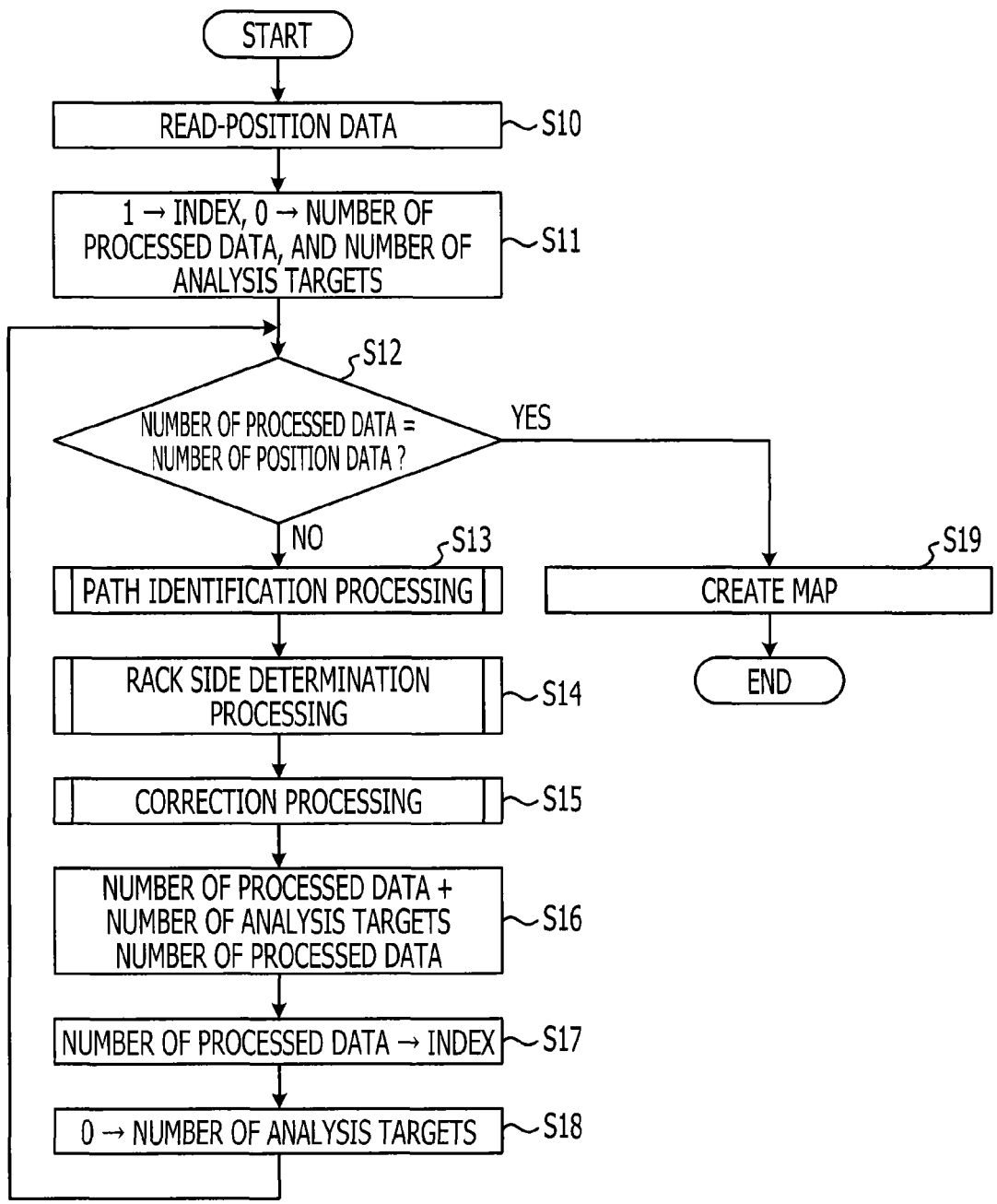
FIG. 13 is an example of a flowchart illustrating a procedure of asset-map generation processing.

FIG. 13 is an example of a flowchart illustrating a procedure of asset-map generation processing. This asset-map generation processing is executed at timing, for example, when a predetermined operation for instructing creation of a map is given to the input unit 43.

As illustrated in FIG. 13, the identification unit 42b reads all the pieces of position data stored in the position data table 40a (S10). The identification unit 42b sets an index to be used for a variable to 1, and initializes the number of processed data and the number of analysis targets to 0 (S11). The identification unit 42b determines whether the number of processed data has become the number of pieces of read-position data (S12). If the number of processed data is not equal to the number of pieces of position data (negation in S12), the identification unit 42b performs path identification processing which identifies a path (S13).

Figure 14:
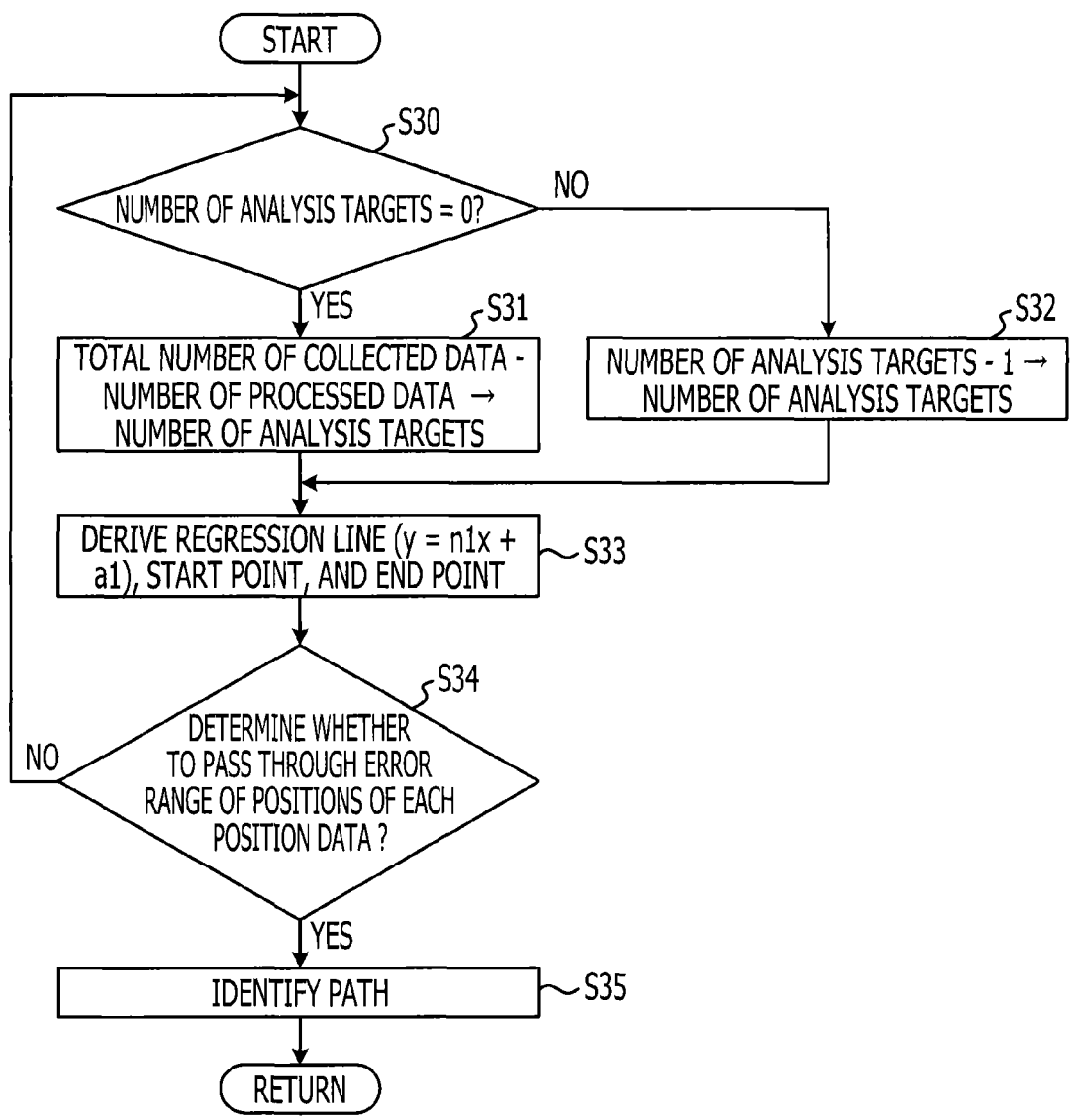
FIG. 14 is an example of a flowchart illustrating a procedure of path identification processing.

FIG. 14 is an example of a flowchart illustrating a procedure of the path identification processing. The identification unit 42b determines whether the number of analysis targets is 0 (S30). If the number of analysis targets is 0 (affirmation in S30), the identification unit 42b sets the difference when the number of processed data is subtracted from the number of read-position data to the number of processing targets (S31). On the other hand, if the number of analysis targets is not 0 (negation in S30), the identification unit 42b subtracts 1 from the number of processing targets (S32). Here, in the determination in S30 at the first time when the path identification processing is called, the number of analysis targets is set to 0 in the above-described S11 and the below-described S18, and thus the processing proceeds to S31. On the other hand, in determination in S30 at the second time and thereafter, the processing proceeds to S32.

The identification unit 42b performs simple regression analysis using position data whose disposition number is from an index value to a value produced by an index value+ the number of analysis targets−1 as position data to be processed in order to derive a regression line and a start point and an end point of the regression line (S33). Here, it is assumed that the derived regression line is $Y=n_1x+a_1$. The identification unit 42b determines whether a section between the start point and the end point of the regression line passes in an error range of positions indicated by individual pieces of position data to be processed (S34). If the section does not pass through the error range in any piece of position data (negation in S34), the processing proceeds to S30. On the other hand, if the section passes through the error range error range (affirmation in S34), the identification unit 42b identifies the derived regression line, the start point, and the end point to be a path of a section of the moving route indicated by each position data to be processed, stores the derived regression line, etc., into the path information table 40b (S35), and the processing proceeds to S14 in FIG. 13.

The determination unit 42c performs rack-side determination processing which identifies which side of the path identified by the path identification processing is a rack side on which managed assets are disposed (S14).

Figure 15:
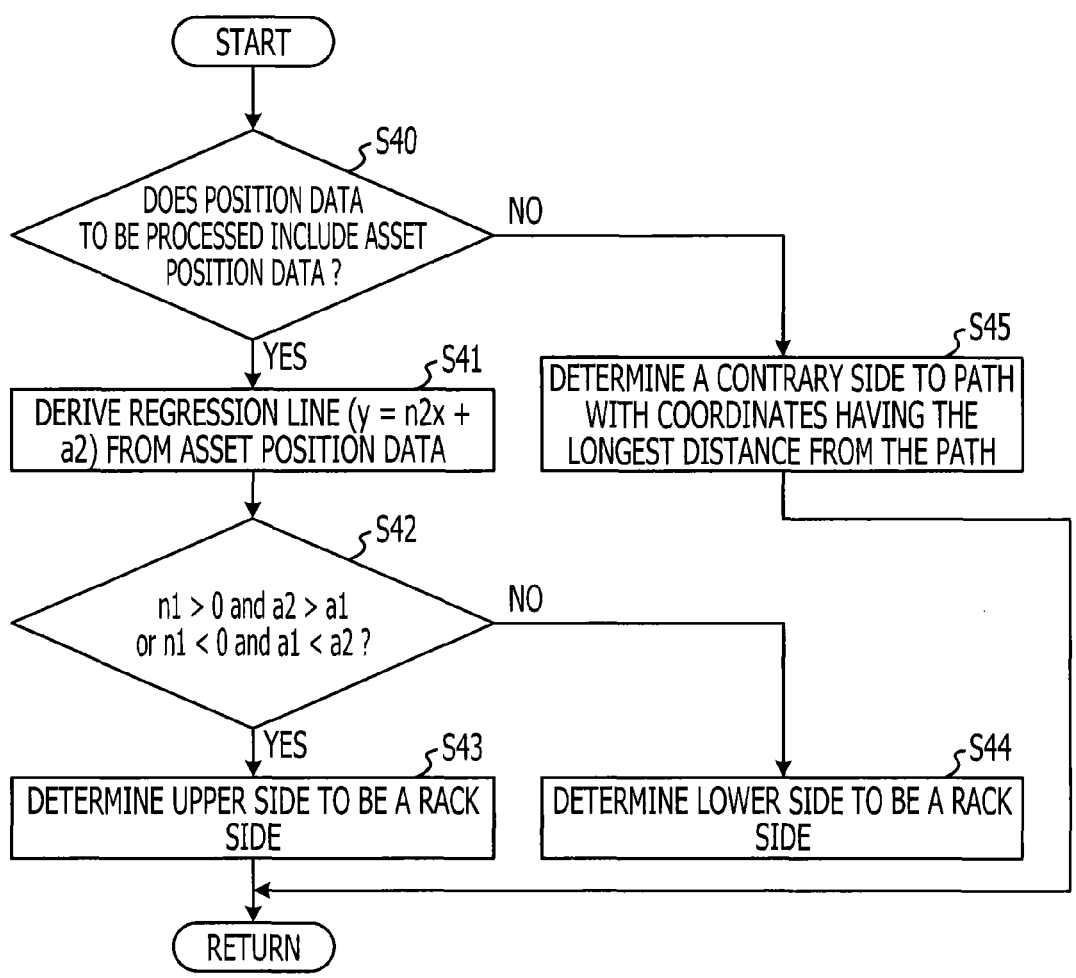
FIG. 15 is an example of a flowchart illustrating a procedure of rack-side determination processing.

FIG. 15 is an example of a flowchart illustrating a procedure of rack-side determination processing. The determination unit 42c determines whether the position data to be processed includes asset position data or not (S40). If asset position data is included (affirmation in S40), the determination unit 42c derives a regression line of asset positions (S41). Here, it is assumed that the derived regression line is $Y=n_2x+a_2$. The determination unit 42c determines whether the slope and the intercepts of a regression line indicating a path $Y=n_1x+a_1$ and the regression line of asset positions $Y=n_2x+a_2$ meet the following conditions (S42).

$n_1>0$ and $a_2>a_1$ or $n_1<0$ and $a_1<a_2$

If the conditions are met (affirmation in S42), the determination unit 42c determines that an upper side of the regression line indicating the path is a rack side (S43), and the processing proceeds to S15 in FIG. 13. On the other hand, if the conditions are not met (negation in S42), the determination unit 42c determines that a lower side of the regression line indicating the path is a rack side path (S44), and the processing proceeds to S15 in FIG. 13. On the other hand, if asset position data is not included (negation in S40), the determination unit 42c determines that a contrary side to a path at a position of the farthest moving route from the path in a section corresponding to the path is a rack side (S45), and the processing proceeds to S15 in FIG. 13.

The correction unit 42d performs correction processing that corrects asset positions (S15).

Figure 16:
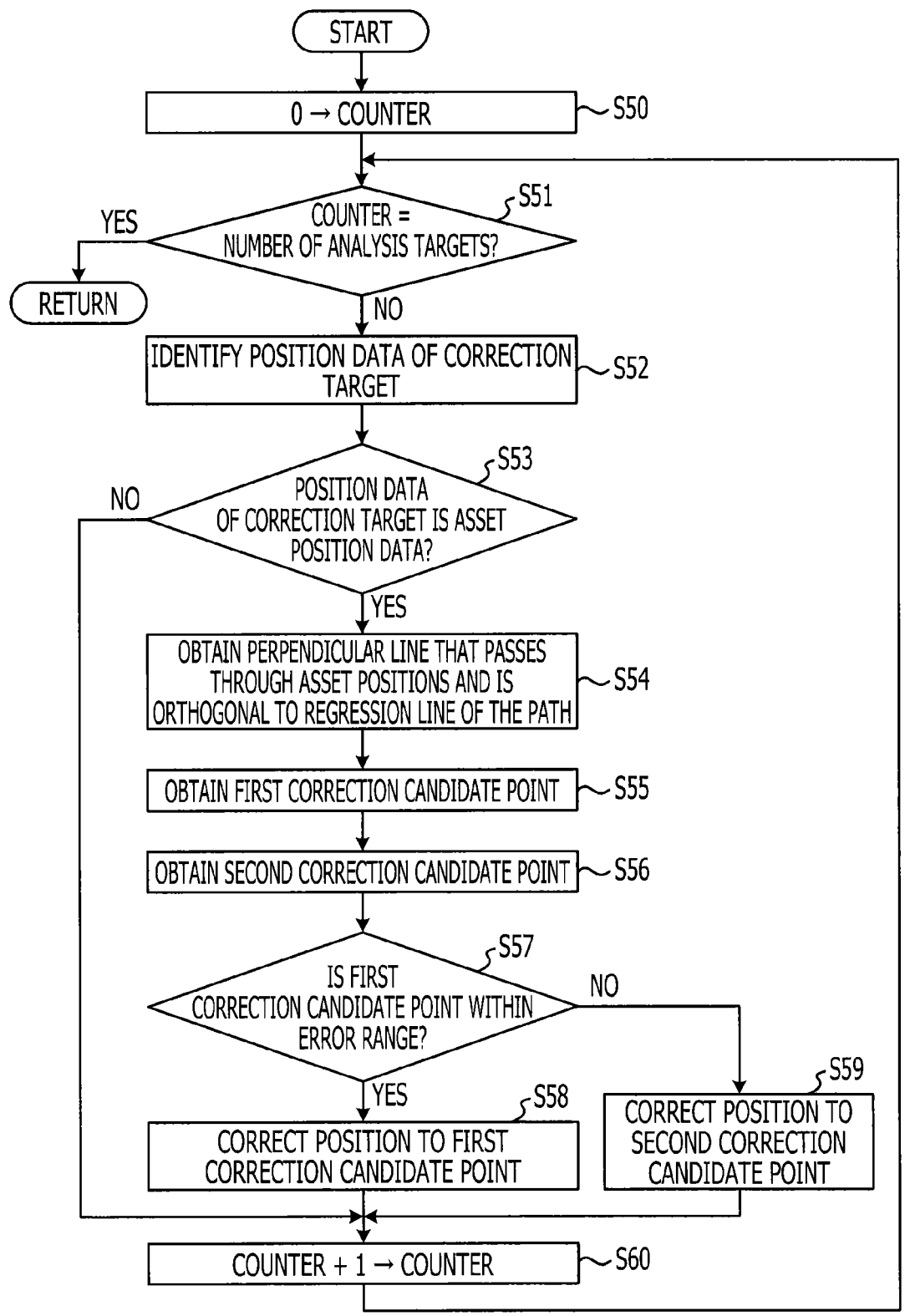
FIG. 16 is an example of a flowchart illustrating a procedure of correction processing.

FIG. 16 is an example of a flowchart illustrating a procedure of correction processing. The correction unit 42d initializes a counter value to be used as a variable to 0 (S50). The correction unit 42d determines whether the counter value becomes the number of analysis targets or not (S51). If the counter value is not the number of analysis targets (negation in S51), the correction unit 42d identifies position data whose disposition number is the number of processed data+the counter value to be position data to be corrected (S52). The correction unit 42d determines whether the position data to be corrected is position data of an asset (S53). If it is not position data of an asset (negation in S53), the processing proceeds to S60 described later. On the other hand, if it is position data of an asset (affirmation in S53), the correction unit 42d obtains a perpendicular line that passes through the asset position, and is orthogonal to a regression line indicating the path (S54). The correction unit 42d obtains coordinates of a position that is a predetermined distance away on the rack side of the perpendicular line from an intersection point between a perpendicular line and a regression line indicating a path as a first correction candidate point. (S55). Also, the correction unit 42d obtains coordinates of a second correction candidate point whose position is the shortest from the first correction candidate point within an error range from an asset position on the perpendicular line. (S56). The correction unit 42d determines whether the first correction candidate point is within an error range of the asset position to be corrected or not (S57). If the first correction candidate point is within the error range of the asset position to be corrected (affirmation in S57), the correction unit 42d corrects the asset position to be corrected to the first correction candidate point (S58). If the first correction candidate point is not within the error range of the asset position (negation in S57), the correction unit 42d corrects the asset position to be corrected to the second correction candidate point (S59). The correction unit 42d adds 1 to the counter value (S60), and proceeds to S51. On the other hand, if the counter value is the number of analysis targets (affirmation in S51), the processing of the correction unit 42d proceeds to S16 in FIG. 13.

The identification unit 42b adds the number of analysis targets to the number of processed data (S16). Also, the identification unit 42b sets a value of the number of processed data in the index (S17). And the identification unit 42b initializes the number of analysis targets to 0 (S18), and the processing proceeds to S12.

On the other hand, when the number of processed data becomes the number of pieces of position data (affirmation in S12), processing on identification of a path for position data, determination of a rack side, correction, etc., has been completed. Thus, the generation unit 42e generates a map illustrating a disposition state of assets (S19), and the processing is terminated.

In this manner, the management server 22 obtains a plurality of pieces of position data individually indicating positions of the managed assets read by the reading device, and individual positions of a moving route on which the reading device has moved. The management server 22 identifies positions of a path on the basis of the obtained plurality of pieces of position data. The management server 22 determines which side of the identified path is a rack side on which assets are disposed on the basis of the plurality of pieces of position data. Also, the management server 22 creates a map on which assets are disposed on the identified paths in the disposition configuration on the basis of a determination result. Thereby, by the management server 22, it is possible to automatically create a map corresponding to an actual floor configuration from moving routes at the time of reading managed assets by the reading device and conducting inventory taking, and thus it is easy to grasp positions of the managed assets.

Also, by the management server 22, it is possible to automatically create a map corresponding to a floor configuration, and thus it is possible to reduce manager's work for creating a map.

Also, if a section of a moving route corresponding to a path includes asset positions, the management server 22 obtains a regression line of the positions of the managed assets, and determines that a disposition side of the regression line with respect to the path is a rack side. Thereby, by the management server 22, it is possible to determine a rack side in a section of the moving route, on which assets are disposed, corresponding to a path, and thus to create a map close to an actual floor configuration.

Also, if a section corresponding to a path of a moving route does not include asset positions, the management server 22 determines that a contrary side of the farthest position of the moving route to the path is a rack side in the section. Thereby, by the management server 22, it is possible to determine a rack side in a section of a path of the moving route on which assets are not disposed, and thus to create a map close to an actual floor configuration.

Also, the management server 22 divides moving routes into a plurality of sections indicated by a plurality of pieces of position data to perform regression analysis, and identifies a regression line having an error between the regression line obtained be the regression analysis and a section corresponding to the regression line within a predetermined range to be positions of the path. Thereby, the management server 22 makes it possible to identify a path from the moving route indicated by the plurality of pieces of position data.

Also, the management server 22 performs correction in order to bring asset positions from the path close to positions at predetermined distance on the rack side, and generates a map on which the corrected assets are disposed in a disposition configuration of the path. Accordingly, even if there is an error in the asset positions identified by the reading device 21, the management server 22 performs correction to positions along the rack side of the path, and thereby making it possible to easily grasp the asset positions.

Third Embodiment

Now, a description has been given of the embodiments on the disclosed apparatus. However, the disclosed technique may be carried out in various modes other than the above-described embodiments. Thus, hereinafter a description will be given of another embodiment included in the present disclosure.

For example, in the above-described second embodiment, if a section corresponding to a path of a moving route includes an asset position, a description has been given of the case where a disposition side of the regression line of the managed assets is identified to be a rack side. However, an apparatus according to the present disclosure is not limited to this. For example, a determination may be made that a contrary side of a path at a position where the moving route is the farthest from the path for a section in which assets are positioned is a rack side.

Also, a description has been given of the case where a bar code attached to an asset is read to check the location of the asset in the second embodiment. However, the apparatus according to the present disclosure is not limited to this. For example, a wireless chip, such as a two-dimensional code or a radio frequency identification (RFID), etc., attached to an asset may be read in order to check the location of an asset.

Also, in the second embodiment, a description has been given of the case where simple regression analysis is performed on positions indicated by each position data to be processed to obtain a linear functional regression line. However, an apparatus according to the present disclosure is not limited to this. For example, multiple regression analysis may be made on positions indicated by each position data to be processed to obtain a quadratic functional or a cubic functional regression line and a start point and an end point of the regression line, and if a section of the regression line between the start point and the end point passes through an error range of positions indicated by each position data to be processed, the positions of the regression line may be identified to be a path.

Also, each component of each device illustrated in the figures is a functional and conceptual entity, and thus each component of each device illustrated in the figure does not have to be physically configured as illustrated in the figures. That is to say, a specific form of distribution and integration of the individual devices is not limited to that illustrated in the figures, and it is possible to configure all of or a part of the devices in a functionally or physically distributed or integrated manner in any unit in accordance with various loads and use states, etc. For example, each processing unit of the acquisition unit 11 and the generation unit 12, illustrated in FIG. 1, may be suitably integrated. Also, each processing unit of the acquisition unit 42a, the identification unit 42b, the determination unit 42c, the correction unit 42d, and the generation unit 42e, illustrated in FIG. 3, may be suitably integrated. Further, it is possible to perform all of or any one of each processing function carried out in each processing unit by a CPU and a program analyzed and executed by the CPU, or by hardware using a wired logic.

Asset-Map Generation Program

Also, it is possible to perform various kinds of processing described in the above-described embodiments by executing programs provided in advance on a computer system, such as a personal computer, a workstation, etc. Thus, in the following, a description will be given of an example of a computer system executing a program having the same function as the above-described embodiments.

Figure 17:
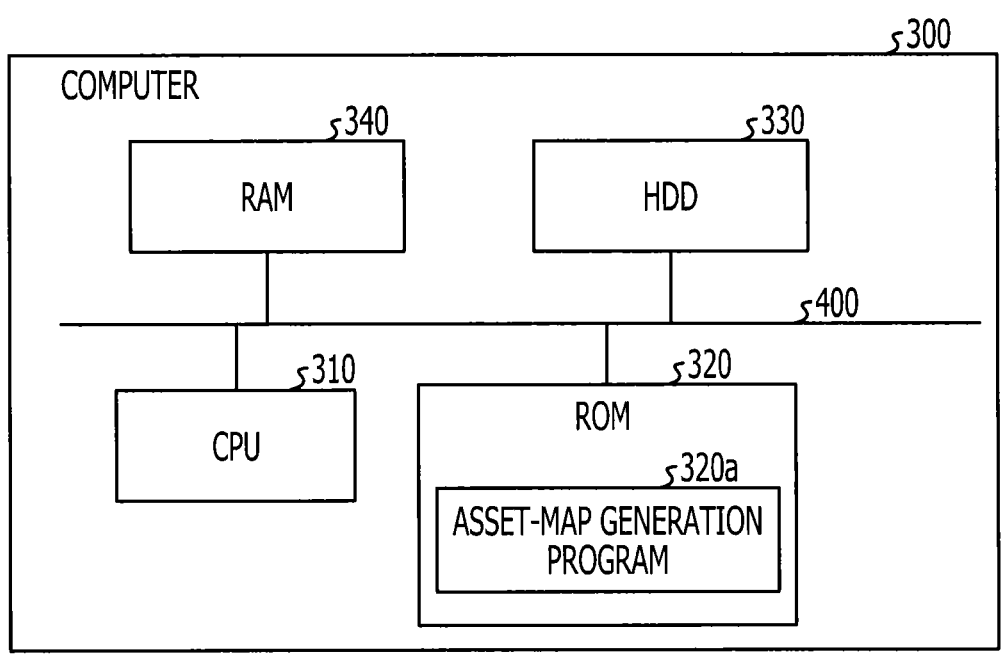
FIG. 17 illustrates an example of a computer on which an asset-map generation program is executed.

FIG. 17 illustrates an example of a computer on which an asset-map generation program is executed.

As illustrated in FIG. 17, a computer 300 has a CPU 310, a ROM 320, a hard disk drive (HDD) 330, and a random access memory (RAM) 340. The CPU 310 is an example of a processor that realizes a function of at least one of the generation unit 12 described in the first embodiment or the identification unit 42b, the determination unit 42c, the correction unit 42d, and the generation unit 42e, described in the second embodiment. The individual units 300 to 340 are connected through a bus 400. The HDD 330 stores tables having the same function as the position data table 40a and the path information table 40b, respectively, illustrated in FIG. 3.

The ROM 320 stores an asset-map generation program 320a The asset-map generation program 320a may be suitably divided.

And the CPU 310 reads the asset-map generation program 320a from the ROM 320, and executes the program so as to perform the same operation as the generation unit 12 described in the first embodiment or the identification unit 42b, the determination unit 42c, the correction unit 42d, and the generation unit 42e, described in the second embodiment.

In this regard, the above-described asset-map generation program 320*a* does not have to be stored in the HDD 330 at first.

For example, the program is stored on a "portable recording medium", such as a flexible disk, a CD-ROM, a DVD disc, a magneto-optical disc, an IC card, etc., that are inserted into the computer 300. And the computer 300 may read the program from these and execute the program.

Further, the program is stored in "another computer (or server)", etc., which is connected to the computer 300 through a public network, the Internet, a LAN, a WAN, etc. And the computer 300 may read the program from these and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a map generation program that causes a computer to execute a procedure, the procedure comprising:
    obtaining position data indicating positions of a terminal device during moving of the terminal device, and obtaining read-position data indicating positions at which the terminal device has read data from one or more recording mediums by scanning the one or more recording mediums during the moving of the terminal device;
    generating a map including one or more paths that are defined based on the positions indicated by the position data; and
    displaying, on the generated map, a disposition area of a target to which one of the recording mediums is attached on a side of one of the paths based on the read-position data, the side at which the disposition area is to be displayed being determined based on at least one of a side that includes a position corresponding to a regression line obtained by analyzing the read-position data.

2. The non-transitory recording medium according to claim 1, wherein the one or more paths are approximate lines acquired based on the position data.

3. The non-transitory recording medium according to claim 1, wherein the position data includes the read-position data.

4. The non-transitory recording medium according to claim 1, the procedure further comprising:
    dividing the positions indicated by the position data into a plurality group of positions; and
    determining the disposition area of the target to which each recording medium is attached in accordance with a positional relationship between paths indicated by positions included in each of the plurality groups and the position indicated by the read-position data.

5. The non-transitory recording medium according to claim 1, wherein the regression line is obtained by performing regression analysis on the read-position data.

6. The non-transitory recording medium according to claim 5, wherein the regression analysis is performed by using the least squares method on the read-position data.

7. The non-transitory recording medium according to claim 5, wherein the regression analysis is performed by one of a simple regression analysis to obtain a linear functional regression line and a multiple regression analysis to obtain one of a quadratic functional and a cubic functional regression line.

8. A map generation apparatus comprising:
    a memory; and
    a processor configured to execute a procedure, the procedure including:
        obtaining position data indicating positions of a terminal device during moving of the terminal device, and obtaining read-position data indicating positions at which the terminal device has read data from one or more recording mediums by scanning the one or more recording mediums during the moving of the terminal device;
        storing the position data and the read-position data in the memory;
        generating a map including one or more paths that are defined based on the positions indicated by the position data; and
        displaying, on the generated map, a disposition area of a target to which one of the recording mediums is attached on a side of one of the paths based on the read-position data, the side at which the disposition area is to be displayed being determined based on at least one of a side that includes a position corresponding to a regression line obtained by analyzing the read-position data.

9. The map generation apparatus according to claim 8, wherein the one or more paths are approximate lines acquired based on the position data.

10. The map generation apparatus according to claim 8, wherein the position data includes the read-position data.

11. The map generation apparatus according to claim 8, wherein the procedure further comprises:
    dividing the positions indicated by the position data into a plurality groups of positions, and
    determining the disposition area of the target to which each recording medium is attached in accordance with a positional relationship between paths indicated by positions included in each of the plurality groups and the position indicated by the read-position data.

12. A map generation method comprising:
    obtaining position data indicating positions of a terminal device during moving of the terminal device, and obtaining read-position data indicating positions at which the terminal device has read data from one or more recording mediums by scanning the one or more recording mediums during the moving of the terminal device;
    generating a map including one or more paths that are defined based on the positions indicated by the position data; and
    displaying, on the generated map, a disposition area of a target to which one of the recording mediums is attached on a side of one of the paths based on the read-position data, the side at which the disposition area is to be displayed being determined based on at least one of a side that includes a position corresponding to a regression line obtained by analyzing the read-position data, using a processor.

13. The map generation method according to claim 12, wherein the one or more paths are approximate lines acquired based on the position data.

14. The map generation method according to claim 12, wherein the position data includes the read-position data.

15. The map generation method of displaying a map, according to claim 12 further comprising:
- dividing the positions indicated by the position data into a plurality groups of positions, and
- determining the disposition area of the target to which each recording medium is attached in accordance with a positional relationship between paths indicated by positions included in each of the plurality groups and the position indicated by the read-position data.

16. A map generation system comprising:
- a terminal device including:
  - a first communication interface device; and
  - a first processor configured to execute a first procedure, the first procedure including:
    - reading out data from one or more recording mediums;
    - identifying positions of the terminal device periodically during moving of the terminal device, and positions at which the terminal device has read data from the one or more recording mediums by scanning the one or more recording mediums during the moving of the terminal device; and
    - generating position data indicating the positions of the terminal device, and read-position data indicating the position at which the terminal device has read data from the one or more recording mediums during the moving of the terminal device; and
- a map generation apparatus including
  - a second communication interface device; and
  - a second processor configured to execute a second procedure, the second procedure including:
    - obtaining the group of position data and the read-position data from the terminal device via the first communication interface device and second communication interface device; and
    - generating a map including one or more paths that are defined based on the positions indicated by the position data; and
    - displaying, on the generated map, a disposition area of a target to which one of the recording mediums is attached on a side defined based on the read-position data, the side at which the disposition area is to be displayed being determined based on at least one of a side that includes a position corresponding to a regression line obtained by analyzing the read-position data.

17. The map generation system according to claim 16, wherein the one or more paths are approximate lines acquired based on the group of position data.

18. The map generation system according to claim 16, wherein the position data includes the read-position data.

19. The map generation system according to claim 16 the second procedure further comprising:
- dividing the positions indicated by the position data into a plurality groups of positions; and
- determining the disposition area of the target to which each recording medium is attached in accordance with a positional relationship between paths indicated by positions included in each of the plurality groups and the position indicated by the read-position data.

* * * * *